(12) United States Patent
Sekar et al.

(10) Patent No.: US 7,736,455 B2
(45) Date of Patent: Jun. 15, 2010

(54) METHODS FOR MANUFACTURING A PAINT ROLLER WITH GROOVED SUBSTRATE

(76) Inventors: Chandra Sekar, 4 Sunset Rd., Searington, NY (US) 11507; Adam B. Landa, 3039 Cecelia Dr., Apopka, FL (US) 32703

( * ) Notice: Subject to any disclaimer, the term of this patent is extended or adjusted under 35 U.S.C. 154(b) by 163 days.

(21) Appl. No.: 12/147,472

(22) Filed: Jun. 26, 2008

(65) Prior Publication Data
US 2009/0320999 A1 Dec. 31, 2009

(51) Int. Cl.
*B32B 37/00* (2006.01)
(52) U.S. Cl. .................. 156/192; 156/190; 156/191; 156/195; 156/256; 156/257; 156/199; 156/209
(58) Field of Classification Search ......... 156/190–192, 156/195, 199, 209, 256, 257, 263, 264
See application file for complete search history.

(56) References Cited

U.S. PATENT DOCUMENTS

| | | |
|---|---|---|
| 2,255,887 A | 9/1941 | Katz |
| 2,331,969 A | 10/1943 | Friedrichs et al. |
| 2,411,842 A | 12/1946 | Adams |
| 2,422,842 A | 6/1947 | Molyneux et al. |
| 2,789,075 A | 4/1957 | Stahl |
| 2,806,803 A | 9/1957 | Thackara et al. |
| 2,948,200 A | 8/1960 | Westerbarkey |
| 3,018,212 A | 1/1962 | Chinn |
| 3,126,306 A | 3/1964 | Sherman |
| 3,226,799 A | 1/1966 | Grodberg et al. |
| 3,274,905 A | 9/1966 | Demsey, Jr. et al. |
| 3,366,719 A | 1/1968 | Lueders |
| 3,411,931 A | 11/1968 | Burns et al. |
| 3,429,522 A | 2/1969 | Cunningham et al. |
| 3,430,543 A | 3/1969 | Cunningham et al. |
| 3,457,130 A | 7/1969 | Morrison |
| 3,460,445 A | 8/1969 | Ried |
| 3,518,970 A | 7/1970 | Burns et al. |
| 3,607,492 A | 9/1971 | Keith et al. |
| 3,620,869 A | 11/1971 | Stump et al. |
| 3,687,778 A | 8/1972 | Cichoski et al. |
| 3,700,520 A | 10/1972 | Hielema |
| 3,761,335 A | 9/1973 | Cichoski et al. |
| 3,960,624 A | 6/1976 | Erlandson |

(Continued)

FOREIGN PATENT DOCUMENTS

DE 1928269 12/1970

(Continued)

*Primary Examiner*—Jeff H Aftergut
(74) *Attorney, Agent, or Firm*—Greenberg Traurig LLP

(57) ABSTRACT

A method for improving strength of the finished product in paint roller manufacturing processes and other continuous processes for producing tubular goods from polymers. The method utilizes a substrate such as a polypropylene strip with grooves on its surface. The grooved substrate is fed onto a mandrel to form a tube. Adhesive is applied upon the grooved surface of the grooved substrate. A cover may be applied about the tube, and the resulting product is then cut into finished-size paint rollers. The hardened adhesive in the grooves may operate to reduce the hoop-force which would otherwise tend to unwind the wound substrate. The method in certain embodiments provides a reduction in cost and weight of the finished product.

29 Claims, 11 Drawing Sheets

U.S. PATENT DOCUMENTS

| | | | |
|---|---|---|---|
| 4,010,054 | A | 3/1977 | Bradt |
| 4,078,957 | A | 3/1978 | Bradt |
| 4,100,007 | A | 7/1978 | Van Zeeland |
| 4,165,956 | A | 8/1979 | Hendy |
| 4,191,792 | A | 3/1980 | Janssen |
| 4,192,697 | A | 3/1980 | Parker et al. |
| 4,689,003 | A | 8/1987 | Schreiner et al. |
| 4,692,975 | A | 9/1987 | Garcia |
| 4,978,406 | A * | 12/1990 | Nakano ................ 156/190 |
| 5,137,595 | A | 8/1992 | Garcia |
| 5,146,646 | A | 9/1992 | Langford et al. |
| 5,195,242 | A | 3/1993 | Sekar |
| 5,206,968 | A | 5/1993 | Bower et al. |
| 5,273,604 | A | 12/1993 | Alvarez Garcia |
| 5,294,276 | A | 3/1994 | Linn et al. |
| 5,397,414 | A | 3/1995 | Garcia et al. |
| 5,398,409 | A | 3/1995 | Sekar |
| 5,468,207 | A | 11/1995 | Bower et al. |
| 5,537,745 | A | 7/1996 | Musch et al. |
| 5,572,790 | A | 11/1996 | Sekar |
| 5,614,047 | A | 3/1997 | Garcia |
| RE35,526 | E | 6/1997 | Alvarez Garcia |
| 5,694,688 | A | 12/1997 | Musch et al. |
| 5,862,591 | A | 1/1999 | Kulkaski |
| 6,145,196 | A | 11/2000 | Ripstein |
| 6,159,134 | A | 12/2000 | Sekar |
| 6,159,320 | A | 12/2000 | Tams et al. |
| 6,175,985 | B1 | 1/2001 | Chambers et al. |
| 6,176,956 | B1 | 1/2001 | Hansen |
| 6,199,279 | B1 | 3/2001 | Humphrey et al. |
| 6,203,648 | B1 | 3/2001 | Barton et al. |
| 6,231,711 | B1 | 5/2001 | Roberts et al. |
| 6,254,710 | B1 | 7/2001 | Sekar |
| 6,539,999 | B2 | 4/2003 | Polzin et al. |
| 6,660,118 | B2 | 12/2003 | Tams et al. |
| 6,815,022 | B2 * | 11/2004 | Renck et al. ................ 428/34.3 |
| 2001/0015252 | A1 | 8/2001 | Tams et al. |
| 2004/0052889 | A1 | 3/2004 | Nespoli |
| 2004/0096604 | A1 * | 5/2004 | van de Camp ............. 428/34.2 |
| 2007/0056132 | A1 | 3/2007 | Yamaguchi et al. |

FOREIGN PATENT DOCUMENTS

| | | |
|---|---|---|
| DE | 4007240 | 10/1990 |
| EP | 0069335 | 1/1983 |
| EP | 0744275 | 11/1996 |
| ES | 2010431 | 11/1989 |
| ES | 2020431 | 8/1991 |
| FR | 2093060 | 1/1972 |
| JP | 5391544 | 8/1978 |
| JP | 5519511 | 2/1980 |
| JP | 6327234 | 2/1988 |
| JP | 6327238 | 8/1988 |

* cited by examiner

METHODS FOR MANUFACTURING A PAINT ROLLER WITH GROOVED SUBSTRATE

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

This invention pertains to a method and apparatus for making paint rollers of the type used for applying paint to walls and the like. More specifically, the invention pertains to a method and apparatus for making paint rollers that are formed in a continuous process from strips with grooves on a surface thereof.

BACKGROUND OF THE INVENTION

Paint rollers are widely used by professionals and amateurs for applying paint to walls, ceilings, and other surfaces. Typically the roller is used with an applicator having a handle terminating in a rotatable member to which the roller is secured. The roller itself generally comprises a paint absorbing and spreading cover affixed to a generally cylindrical core. The covers may be made from materials such as wool or polyester, and other cover materials that are well known in the art.

Years ago paint rollers were manufactured using a paper or chipboard core. Some manufacturers still make such paper core paint rollers. The manufacture of such cores is well known. Such cores, however, and the paint rollers made out of them, would often fall apart during use or during cleaning, especially during cleaning with paint solvents (such as, for example, turpentine or mineral spirits, such paint solvents are well known in the art). It has always been desirable, and still remains desirable, to make the paint roller resistant to paint solvents.

An advance in making paint rollers came when the paper cores were replaced with phenolic cores, that is, cores made from paper impregnated with phenolic. Such paint rollers withstood exposure to paint solvents much better than their paper or chipboard counterparts. The process of manufacturing phenolic cores is also well known. For example, according to one known technique, a reusable disposable roller is made by first feeding three phenolic impregnated paper strips at an angle to a mandrel for overlapping, helical winding to form an endless core. Typically, the phenolic strips are supplied in rolls that can be mounted on spindles for continuous feeding, and a continuous thermosetting glue is applied to the outer surfaces of the strips as they feed off the rollers such that the strips adhere together as they are helically wound to form the core. As the endless core is belt driven down the line, the core is heated in a multi-stage infrared heater, after which a hot melt glue is applied to the core's outer surface and a continuous strip of the cover material, such as polyester, is helically wound on to the core where it is secured by the hot melt. All that remains is to cut the resulting endless roller down to usable sizes, which is usually accomplished in two steps, first using a fly away cutter to cut, e.g., 65 inch stock, and then using another cutter to cut the stock into usable lengths of, e.g., seven or nine inches.

The obvious drawback of reusable cores formed in this manner is that they require a long assembly line, due to the need of a heater, and because the phenolic must be heated to a predetermined temperature, there is an obvious trade off between the number of heater stages and the speed of the line. Additionally, while the resulting rollers are termed reusable because they do not separate when placed in paint solvents, any prolonged exposure to such solvents, does result in breakdown of the paint roller and/or separation of the layers. Moreover, the manufacturing process for making phenolic core rollers is environmentally unfriendly.

Another reusable roller is disclosed in U.S. Pat. No. 4,692,975 issued to Garcia, wherein the roller is formed using a preformed core made of thermoplastic (e.g. polypropylene) tubular stock. In particular, the process disclosed mounting a preformed core on a rotating spindle, providing a carriage movable in a direction parallel to the spindle, and providing on the carriage a direct heat source and, at an angle to the spindle a continuous strip of fabric. The disclosed process consisted of igniting the direct heat source to begin heating the outer surface of the tubular stock and moving the carriage parallel to the spindle in timed relation to the spindle's rotation so that the fabric strip is wound on the heated portion of the plastic core in a tight helix. The heated portion of the plastic core was thereby heat-softened just in advance of the point where the fabric strip is applied, such that the fabric is bonded to the core as it is wound thereon. In effect, a portion of the polypropylene core surface is used as the bonding adhesive. One advantage of the roller disclosed in the Garcia patent is that the bond formed between cover and core is a strong one not easily subject to separation from exposure to paint solvents. Another advantage is that the manufacturing process does not require the application of a separate adhesive to bond the cover to the core. There are, however, drawbacks. For one, while prior art techniques use rolls of, e.g., chipboard or paper, the Garcia process requires preformed thermoplastic tubular cores which are considerably bulkier than rolls, more expensive to transport, and more difficult to handle. Another drawback is the anticipated speed limit of the Garcia process dictated by the necessity that the heater, which advances along the core just in front of the fabric strip, move slow enough to insure softening of the polypropylene core, in the absence of which the fabric cover will not bond. In addition, the application of direct heat to the preformed polypropylene core presents manufacturing hazards from the heat source and from the fumes and/or chemicals released during the heating process.

U.S. Pat. No. 5,195,242, which is incorporated herein by reference in its entirety, issued to one of the present inventors and resolved many of the foregoing problems by (i) forming the thermoplastic core on the fly instead of using preformed cores, and (ii) using preheated thermoplastic as a glue, both to form the core by applying it between the strips forming the core, and to affix the cover to the core by applying it to the outside of the core before wrapping the cover thereabout. The patent describes a process involving the wrapping of three strips of thermoplastic material (preferably polypropylene) around a mandrel in overlapping relation to form a core, the strips making the core are bonded together by applying a liquefied thermoplastic material (again, preferably polypropylene) thereto prior to wrapping them about the mandrel. After the core is thus formed a liquefied thermoplastic (again, preferably polypropylene) is applied to the outer surface of the core, and a cover wrapped thereupon. All that remains, as is well known, is to cut the resulting endless roller down to usable sizes, which, as described above may be accomplished in two steps, first using a fly away cutter to make longer lengths, and then using another cutter to cut the stock into usable lengths. While this process was capable of making high quality rollers that were substantially unaffected by paint solvents, the process involved the use of multiple strips of thermoplastic material and numerous points of application for liquefied thermoplastic. As a result, the process was difficult to set up, and required many continuous adjustments in its operation.

U.S. Pat. No. 5,468,207 issued to Bower discloses a continuous process using direct heat to bond the surface of the thermoplastic plastic strips instead of applying liquefied thermoplastic to the strips to bond them together. Bower also discloses using direct heat to the surface of the core to bond the cover rather than applying liquefied thermoplastic prior to applying the cover.

U.S. Pat. No. 5,572,790, which is incorporated herein by reference in its entirety, also issued to one of the present inventors, and resolved some of the complexity problems of the foregoing process. Under this process, which has become the de facto standard for roller manufacturing today, instead of forming a core by winding a plurality of strips in overlapping relation about a mandrel, and then affixing a cover thereto, it was disclosed to wind only a single strip about the mandrel, the adjacent edges thereby placed in a closely-spaced or abutting relation. A liquefied thermoplastic material (preferably, polypropylene) is then applied to the exposed surface of the wound strip, and a roller is formed by helically winding the cover over the liquefied material and the wound strip with sufficient tensile force so that the fabric cover lays smoothly thereupon. Again, as with other endless roller manufacturing, a fly-away cutter may be first used to cut the product into longer lengths, and then such lengths may be cut to usable lengths. This process represented an advance over the previous method invented by the present inventor because the entire paint roller was formed in a single step which made the assembly line easier to manage as there was only a single strip of material and a single application of liquefied thermoplastic. The resulting roller, however, is somewhat inferior. More specifically, a defect present in all such rollers, manifests itself as a weak point, often sticking out from the ends of a cut roller, or making the ends of the cut roller appear "out of round." This results from the high tension memory of the strip which tends toward unwinding or toward "open" with high hoop strength. Moreover, to achieve the desirable hardened feel of the multi-layer rollers, the single strip rollers are generally made using a thicker plastic strip. The thicker the plastic strip used, (especially in relation to the diameter of the core) the more pronounced the memory effect appears on the roller.

U.S. Pat. No. 5,862,591 discloses another method of forming a paint roller in a single step. In this process, strips of thermoplastic are not used, and instead, a fluidized polypropylene is applied directly to a mandrel, and a cover is placed thereupon. The application of fluidized polypropylene to a mandrel has concomitant complications in synchronization and in the problems inherent in working with consistency of application of a fluidized layer in forming a polypropylene core. Like this process, other proposals have been made for placing the pile fabric on a heated core, as for example in French Patent Publication 2,093,060, in which pile fabric is placed on a hot, freshly extruded core. It is, however, believed that no such systems have the difficulties associated with controlling the shrinkage variation which inevitably occurs in the matching of what is essentially a through heated core blank or strip blank and a cold (i.e., room temperature, for example) pile fabric.

U.S. Pat. No. 6,159,134, which is incorporated herein by reference in its entirety, also issued to one of the present inventors, and represented an advance for making paint rollers having thermoplastic cores and a fully integrated cover that are formed in a single-step continuous process from two polypropylene strips. Under this process, two strips of thermoplastic material are helically advanced about each other around a mandrel in an offset relation. Then, a cover is helically advanced about the second strip while providing an adhesive between the first strip and the second strip and between the outer surface of the strips and the cover. A continuous laminated paint roller is formed by applying a compressive force upon the cover.

SUMMARY OF THE INVENTION

In accordance with one embodiment of the present invention a substrate with a grooved surface is fed about a mandrel. Adhesive is applied upon the outer surface of the grooved substrate. A cover is applied and bonded about the grooved substrate so that the adhesive on the outer surface of the grooved substrate is covered. A compressing force is applied upon the cover, urging it toward the grooved substrate.

Some embodiments include grooves that run parallel to one another. In various embodiments, the cross-section of a groove may include a section of one of the following shapes: circle, elliptic, oval, quadrilateral, square, rectangle, rhombus, trapezoid, kite, diamond, triangle, pentagon, hexagon, heptagon, or octagon.

In some embodiments, the grooved surface of the polypropylene strip may include the inner surface of one wind of the polypropylene strip. In other embodiments, the grooved surface of the polypropylene strip may include the outer surface of one wind of the strip. Still, in other embodiments, the grooved surface of the strip may include both the outer surface and the inner surface of one wind of the polypropylene strip.

For some of the embodiments which have grooves on the outer and the inner surfaces of the strip, the grooves on the inner surface of the strip are positioned along the longitudinal axis of the strip at an offset in relation to the grooves on the outer surface of the strip. In certain embodiments, the grooves on the inner surface of the strip may be the same shape as the grooves on the outer surface of the strip.

Some embodiments may have strips with grooves which run parallel to one another. These parallel grooves may run continuously along an axis of the strip. For certain embodiments, the parallel grooves translate along the longitudinal axis of the strip. For other embodiments, the parallel grooves translate along the latitudinal axis of the strip. These parallel grooves may run parallel to, or at an angle to, the latitudinal axis. In addition, the parallel groove may be straight or curved.

Another embodiment includes a method that comprises the steps of: shaping a surface of a substrate in order to form grooves on the surface; feeding the grooved substrate about a mandrel; applying adhesive upon the outer surface of the grooved substrate; applying and bonding a cover about the substrate to cover the adhesive, and applying a compressing force upon the cover in order to urge the cover toward the substrate. The substrate may be a polypropylene strip. In some embodiments, the surface may be shaped by applying a compressing force upon the substrate in order to create grooves. Certain embodiments include feeding the substrate through a rotary die with two cylinders. While one cylinder has ridges, the other has a smooth surface. As the substrate passes between the cylinders, the ridges press into the surface of the substrate to form the grooves.

Another embodiment includes a method that comprises the steps of: grooving and removing an overage from a substrate; collecting the overage; feeding the grooved substrate about a mandrel; and, applying and bonding a cover about the substrate. While the removal of the overage results in a reduction in the weight of the paint roller, the strength of the paint roller is not detrimentally compromised by the removal of the overage in certain embodiments. Furthermore, the overage is reusable in a subsequent implementation of the method. Some embodiments also include the step of reclaiming the overage so that the overage may be reused in the subsequent implementation of the method. Alternative embodiments may include the step of selling the overage in order to recoup a portion of the expense spent for producing the paint roller.

Some embodiments perform the step of grooving the substrate by feeding the substrate along knives or rotary/drill bits which create the grooves on the surface of the substrate. For certain of these embodiments, the raw substrate is a polypropylene strip and the overage is a polypropylene byproduct. In some embodiments, the byproduct may be collected by vacuuming it with a vacuum adjacent to knives or rotary/drill bits. As described above, the collected byproduct may be reclaimed or sold.

According to certain embodiments, the step of feeding the substrate onto the mandrel includes the following steps: feeding a first grooved strip of polypropylene about the mandrel; feeding a second grooved strip of polypropylene about the first grooved strip of polypropylene in offset relation; and applying adhesive. The adhesive may be applied to a portion of the outer surface of one wind of the first grooved strip, an adjacent portion of the outer surface of a subsequent wind of the first grooved strip, and substantially all of the outer surface of a wind of the second grooved strip.

In addition, these embodiments may also apply and bond the cover by feeding a cover about the second grooved strip and applying a compressing force upon the cover. This urges the cover toward the second grooved strip and simultaneously urges the second grooved strip toward the first grooved strip, thereby creating the paint roller. The embodiments may also include the step of cutting the paint roller into lengths.

In some embodiments, the grooves of the first grooved strip may be positioned at an offset in relation to the grooves of the second grooved strip. The various embodiments may include grooves of different shapes. The shapes may include the following: circle, elliptic, oval, quadrilateral, square, rectangle, rhombus, trapezoid, kite, diamond, triangle, pentagon, hexagon, heptagon, octagon. The shapes of the grooves of the first grooved strip may be a different shape from the shape of the grooves of the second grooved strip.

An alternate embodiment for producing paint rollers may include the steps of: feeding a surface-relieved substrate about a mandrel, where a surface of the substrate has surface-reliefs; applying adhesive upon the outer surface of the surface-relieved substrate; applying and bonding a cover about the surface-relieved substrate to cover the adhesive on the outer surface of the surface-relieved substrate; and, applying a compressing force upon the cover urging it toward the surface-relieved substrate. Again, the substrate may be a polypropylene strip in certain embodiments. In various embodiments, the cross-section of a surface-relief may include a section of one of the following shapes: circle, elliptic, oval, quadrilateral, square, rectangle, rhombus, trapezoid, kite, diamond, triangle, pentagon, hexagon, heptagon, octagon.

In some embodiments that use a surface-relieved substrate, the relieved surface of the polypropylene strip may include the inner or outer surface of one wind of the polypropylene strip. Still, in other embodiments, the relieved surface of the strip may include both the outer surface and the inner surface of one wind of the polypropylene strip.

For some of the embodiments which have reliefs on the outer and the inner surfaces of the strip, the surface-reliefs on the inner surface of the strip are positioned along the longitudinal axis of the strip at an offset in relation to the surface-reliefs on the outer surface of the strip. In certain embodiments, the surface-reliefs on the inner surface of the strip may be the same shape as the surface-reliefs on the outer surface of the strip. Whether an embodiment has strips with surface-reliefs on one or more of its surfaces, one of the surface-reliefs may be a dimple which does not intersect with the edge of the strip. Such dimples may be positioned in parallel rows on the strip.

The light and inexpensive paint rollers are thus formed with a simplified assembly line and process, comprising:

a) a groover;

b) feeders for the two polypropylene strips and the cover strip, c) a heater for activating an adhesive layer or an extruder for applying an adhesive layer, d) a stationary cooled mandrel, e) a transport means such as a helical drive belt to form and advance the endless roller, and f) a cutter.

Another embodiment includes a method for producing tubular products including the steps of: grooving and removing an overage from a raw substrate to form grooves and reduce its weight; collecting the overage which may be reusable in a subsequent implementation of the method; and, feeding the processed substrate onto a mandrel, thereby positioning the processed substrate to be used as a tubular product.

The embodiments may comprise of a novel combination that uses two strips of polypropylene material to provide an method and apparatus for making superior, light weight, and inexpensive paint rollers.

The above and other object, features and advantages of the embodiments will become more evident from the following discussion and drawings in which:

Figure 10A:
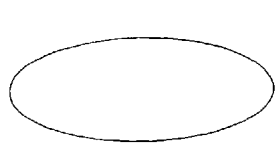
Figure 10B:
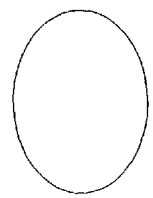
Figure 10C:
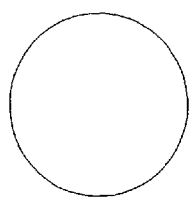
Figure 10D:
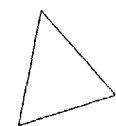
Figure 10E:
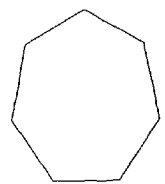
Figure 10F:
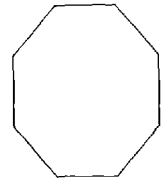
Figure 10G:
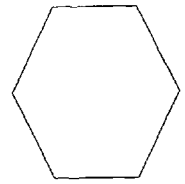
Figure 10H:
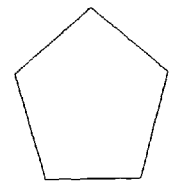
Figure 10I:
Figure 10J:
Figure 10K:
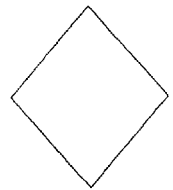
Figure 10L:
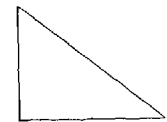
Figure 10M:
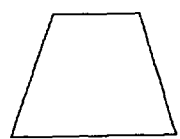
Figure 10N:
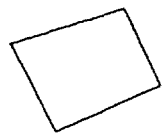
Figure 10O:
Figure 10P:
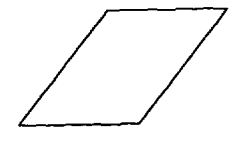
Figure 11:
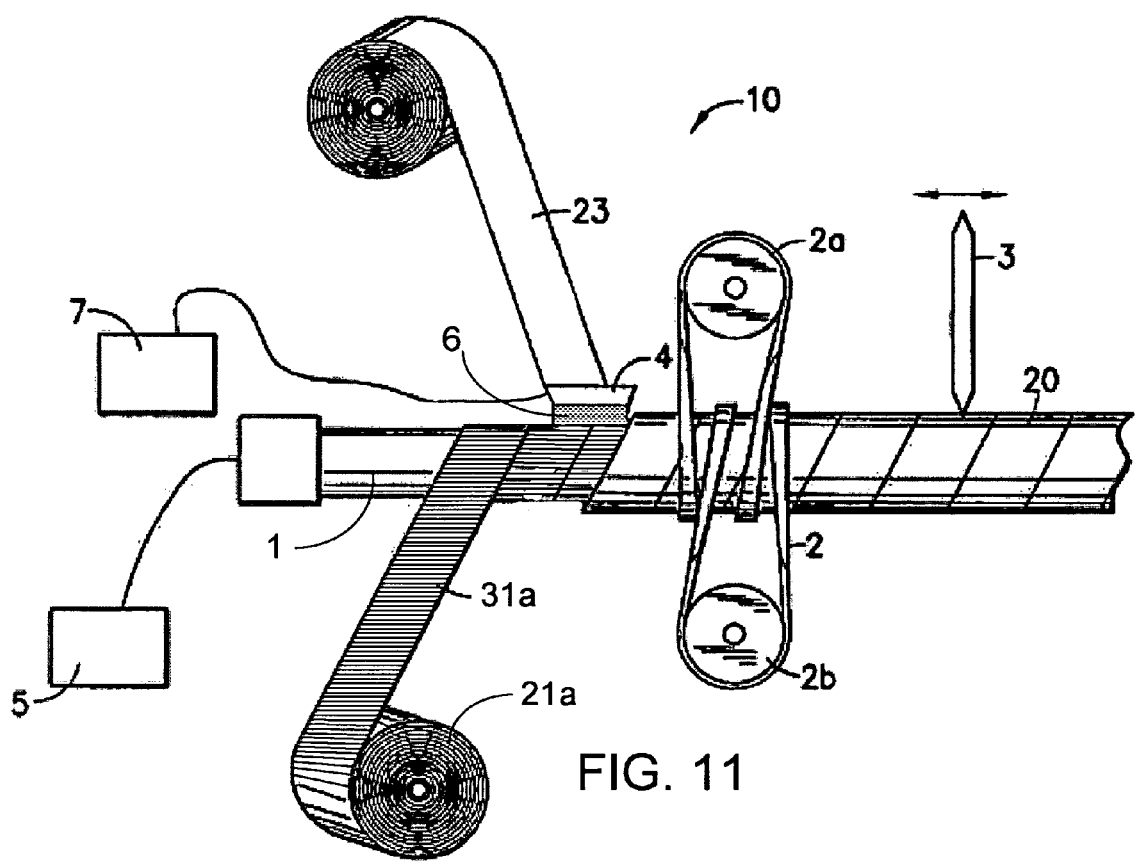
Figure 12A:
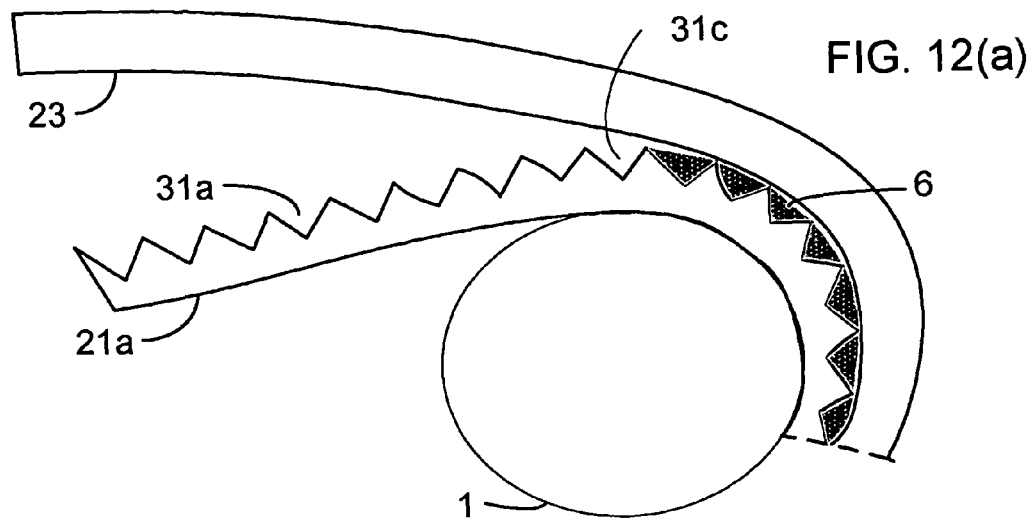

parallel grooves that translate at an angle to the latitudinal axis of the strip, (b) parallel grooves that run parallel to the longitudinal axis of the strip, (c) parallel grooves that run parallel to the latitudinal axis of the strip, and (d) curved grooves that run along the longitudinal axis of the strip;

FIG. 9(a)-(g) are cross-sectional side-view diagrammatic representations of various shapes of grooves in a strip in accordance with the present invention;

FIG. 10(a)-(p) are diagrammatic representations of various shapes of dimples on a strip in accordance with the present invention;

FIG. 11 a diagrammatic representation of an apparatus suitable for making rollers from one grooved strip in accordance with the present invention;

FIGS. 12(a) and (b) are cross-sectional diagrammatic representation of grooved stripes about a mandrel in accordance with the present invention, wherein the strips are not drawn to scale for the purpose of illustrating the grooves.

DETAILED DESCRIPTION OF THE INVENTION AND THE PREFERRED EMBODIMENTS

Figure 1:
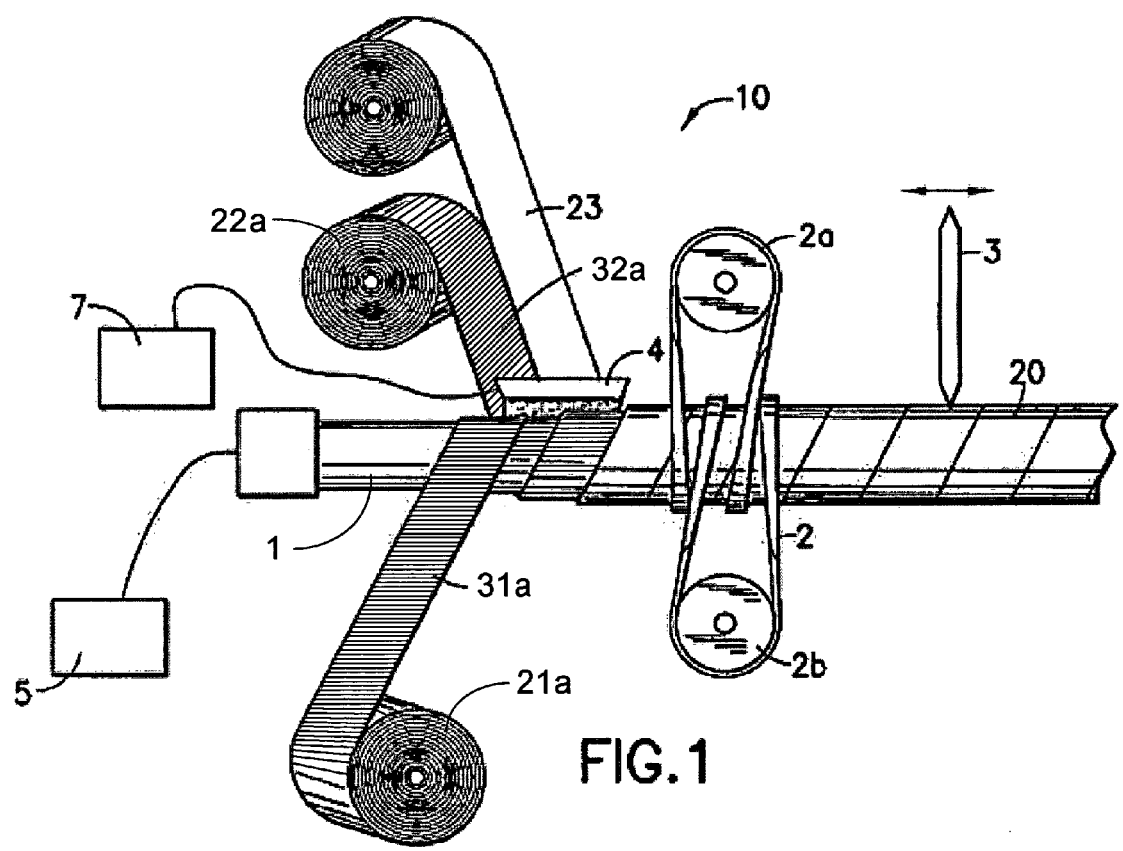
FIG. 1 is a diagrammatic representation of an apparatus suitable for making rollers in accordance with the present invention, wherein the strips are grooved.

In the embodiment shown in FIG. 1, a roller forming apparatus 10 comprises a stationary mandrel 1, cooled by cooler 5, on which the roller 20 is formed, helical drive belt 2 moves by between drive rollers 2a and 2b to turn and move the formed endless roller 20 along the mandrel 1 to a fly-away cutter 3. A paint roller is manufactured from an inner strip of thermoplastic material 21a, an outer strip of thermoplastic material 22a, a cover 23, and an adhesive 6 applied from one or more heads 4. The thermoplastic material is preferably polypropylene. The strips 21a, 22a contain grooves 31a, 32a, respectively. The cover 23 may be a well-known fabric cover for a paint roller, which can be made of polyester.

For ease of discussion in this application, the term "downstream" refers to the direction further along in the roller manufacturing process, or nearer the fly-away cutter 3, while the term "upstream" refers to the direction earlier in the roller manufacturing process, or further from the fly-away cutter 3.

The inner strip 21a is helically advanced about the mandrel 1. The term helically as used herein means oriented about a mandrel so as to permit the downstream edge of a given wind of a strip to be in closely-spaced or abutting relation with the upstream edge of the preceding wind of the strip. As is well known in the art, a lubricant such as 5% mineral oil may be applied to the inner surface of the inner strip 21a prior to winding on the mandrel 1.

The outer strip 22a is helically advanced about the inner strip 21a. The edges of the outer strip 22a may be offset from the edges of the inner strip 21a as the two strips are advanced along the mandrel 1. The offset between outer strip 22a and inner strip 21a causes outer strip 22a to overlap the portion of the inner strip 21a where its upstream and downstream edges are in closely-spaced or abutting relation. It is believed that the a stronger product is yielded from having an offset between the inner strip 21a and the outer strip 22a. An offset of between one-quarter and three-quarters of the width of the inner strip 21a is found to achieve acceptable results.

The cover 23 is helically advanced about the outer strip 22a.

The head 4 provides a layer of adhesive material 6 from a source of such material 7, the adhesive material 6 is preferably polypropylene. The source of adhesive material 7 is preferably an extruder, but may be any source of adhesive material including a melter. The head 4 may be any type of head appropriate for providing adhesive material 6 from the source, such as a nozzle or a die. In certain embodiments, where the source 7 is an extruder, the head 4 is preferably a die.

Prior to the hardening and setting of the adhesive material 6, the belt drive 2 applies pressure to the outer surface of the cover 23, imparting inward forces on the component parts, and thereby forming the continuous roller about the mandrel. In addition to forming the roller, the belt drive 2 advances the thus-formed endless roller along the mandrel, and continuously rotates the endless roller, thereby also advancing the strips 21a, 22a and the cover 23 toward and around the mandrel.

The width and thickness of the strips 21a, 22a, and the cover 23 width and pile may be those that are appropriate for manufacture of the desired roller. For example, a typical high quality roller having a 1.5-inch diameter core and a 90-wall can be manufactured with the following materials:

|  | Width | Thickness |
| --- | --- | --- |
| Inner Strip | 2.750" | 0.025" |
| Adhesive Layer One | 2.750" | 0.020" |
| Outer Strip | 2.750" | 0.025" |
| Adhesive Layer Two | 2.750" | 0.020" |
| Cover | 2.875" | Desired Pile |

As used herein, the term "wall" or "mil" means thickness in thousandths of an inch. Such widths and thickness and the methods of determining them are well known in the art. It will be apparent to one of skill in the art that almost infinite variation is possible depending upon the characteristics of the desired roller.

The amount of adhesive should depend to some extent on the cover 23 material. A head 4 may be used that is significantly shorter than the preferred width. Although this embodiment will accommodate a rather large variation in the width of the head 4, and therefore in the width of material that is supplied by the head 4, it is believed that using a head 4 that provides the desired width of adhesive onto the strips 21a, 22a will yield the most consistent results. It is further possible, without departing from the invention, to use more than one head to apply the adhesive to advance between the strips 21a, 22a and to advance between the cover 23 and the outer strip 22a. Regardless of the width or number of heads, in order to produce a quality laminated continuous roller, pressure must be applied inwardly upon the cover before the two layers of polypropylene are permitted to harden and set.

In an embodiment, the orientation for feeding the strips 21a, 22a and the cover 23, as shown in FIG. 1, permits the cover 23 to be advanced toward the mandrel 1 adjacent and parallel to the outer strip 22a. Such positioning permits the use of a single head 4 that can apply adhesive 6 to the outer surface of the inner strip 21a and to the outer surface of the outer strip 22a simultaneously. Additionally, this positioning permits the adhesive 6 to be applied uniformly and then sandwiched between the inner and outer strips 21a, 22a or the outer strip 22a and the cover 23. Further, this positioning permits a short assembly line for the continuous manufacturing process.

As is well known in the art, the endless roller 20 may be cut by the fly-away saw 3 into lengths after it has set sufficiently. Employing the present embodiment, the entire length of the assembly line required to manufacture superior quality paint rollers can have less than 20 inches of mandrel 1, and less than 20 inches between the belt drive 2 and the fly-away saw 3.

Figure 2:
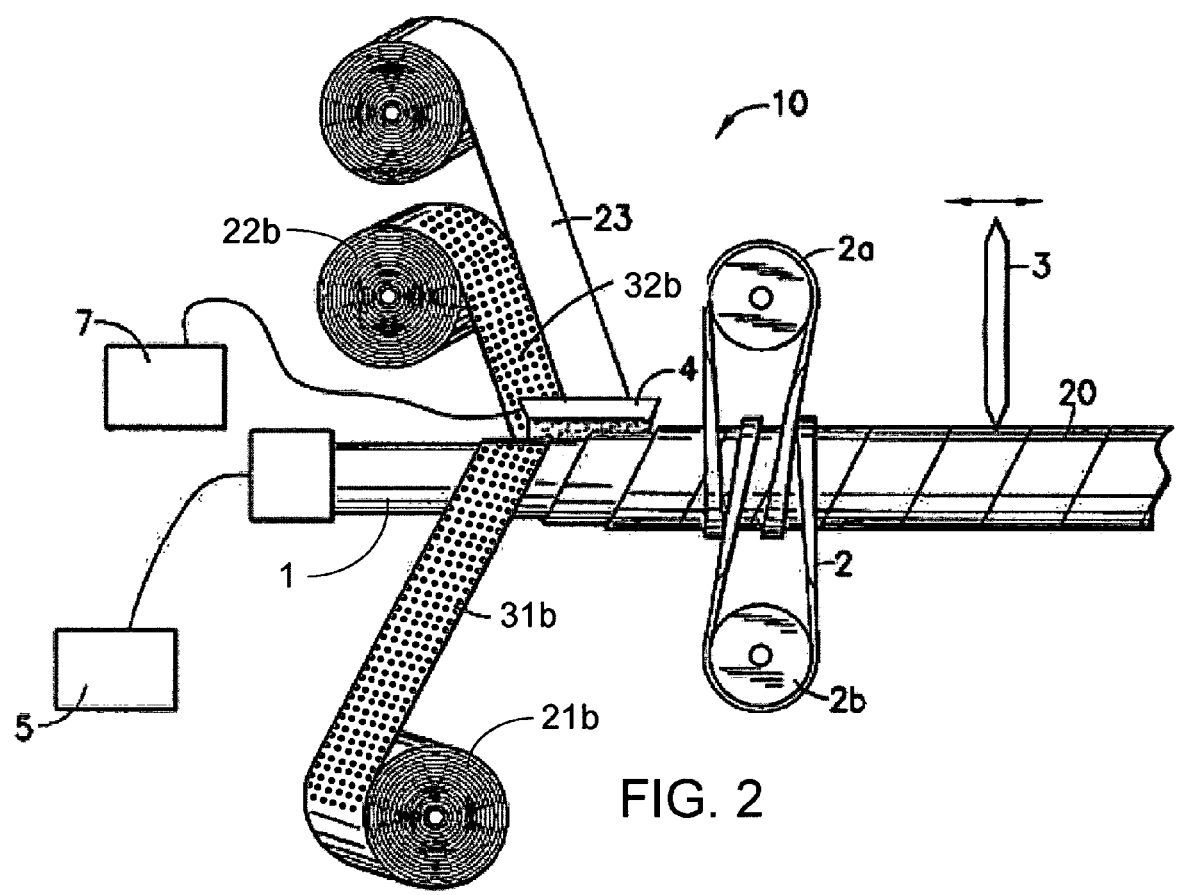
FIG. 2 is a diagrammatic representation of an apparatus suitable for making rollers in accordance with the present invention, wherein the strips have dimples.

FIG. 1 shows an embodiment in which the strips 21a, 22a contain grooves 31a, 32a. FIG. 2 shows an alternate embodiment in which the strips 21b, 22b contain dimples 31b, 32b. The grooves or dimples may occur on either or both of the strips. In addition, the grooves or dimples may occur on either or both of the sides of the strips.

Figure 3:
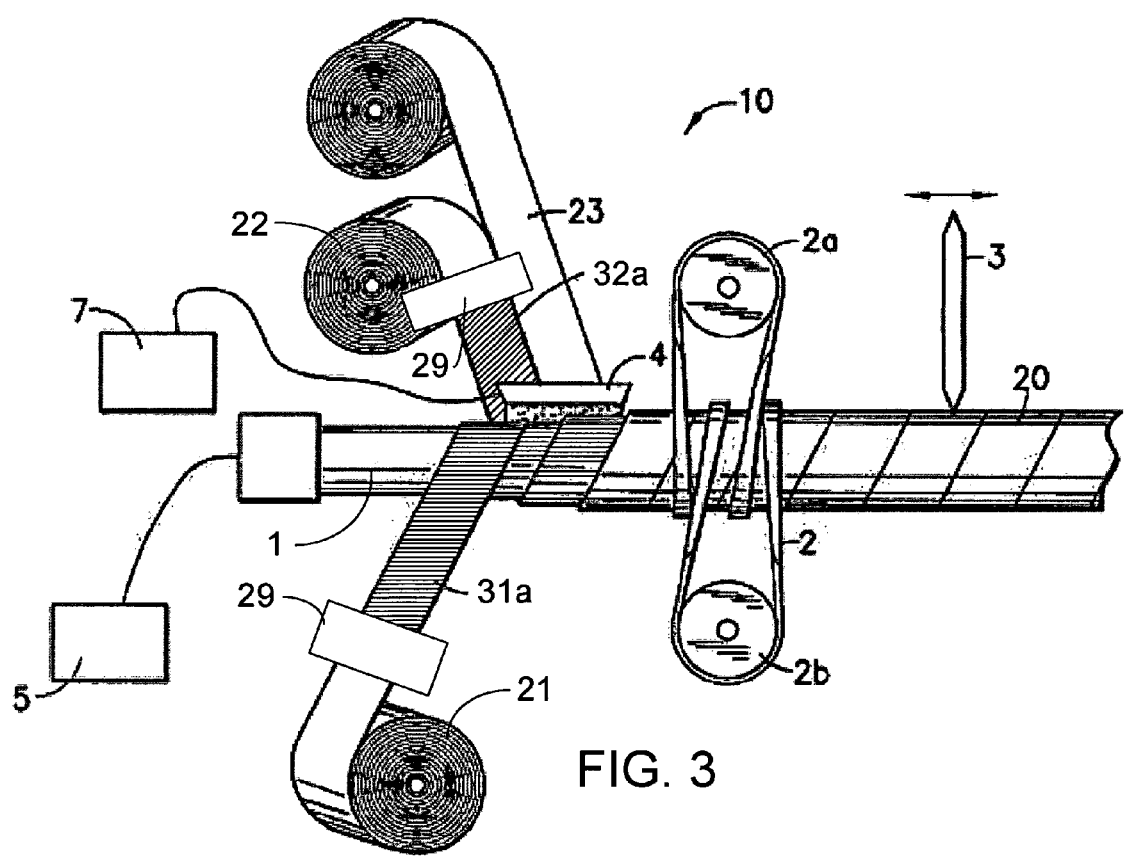
FIG. 3 is a diagrammatic representation of an apparatus with a groover suitable for making rollers in accordance with the present invention.

As shown in FIG. 3, the strips 21, 22, may be processed by a groover 29 to form the grooves 31a, 32a on the polypropylene strips 21, 22 during the process of manufacture of paint roller. The groover 29 may form grooves 31a, 32a on strips 21, 22 through the use of a rotary die 30, or through other means such as abrading, carving, scraping or cutting grooves into the strips.

Figure 4:
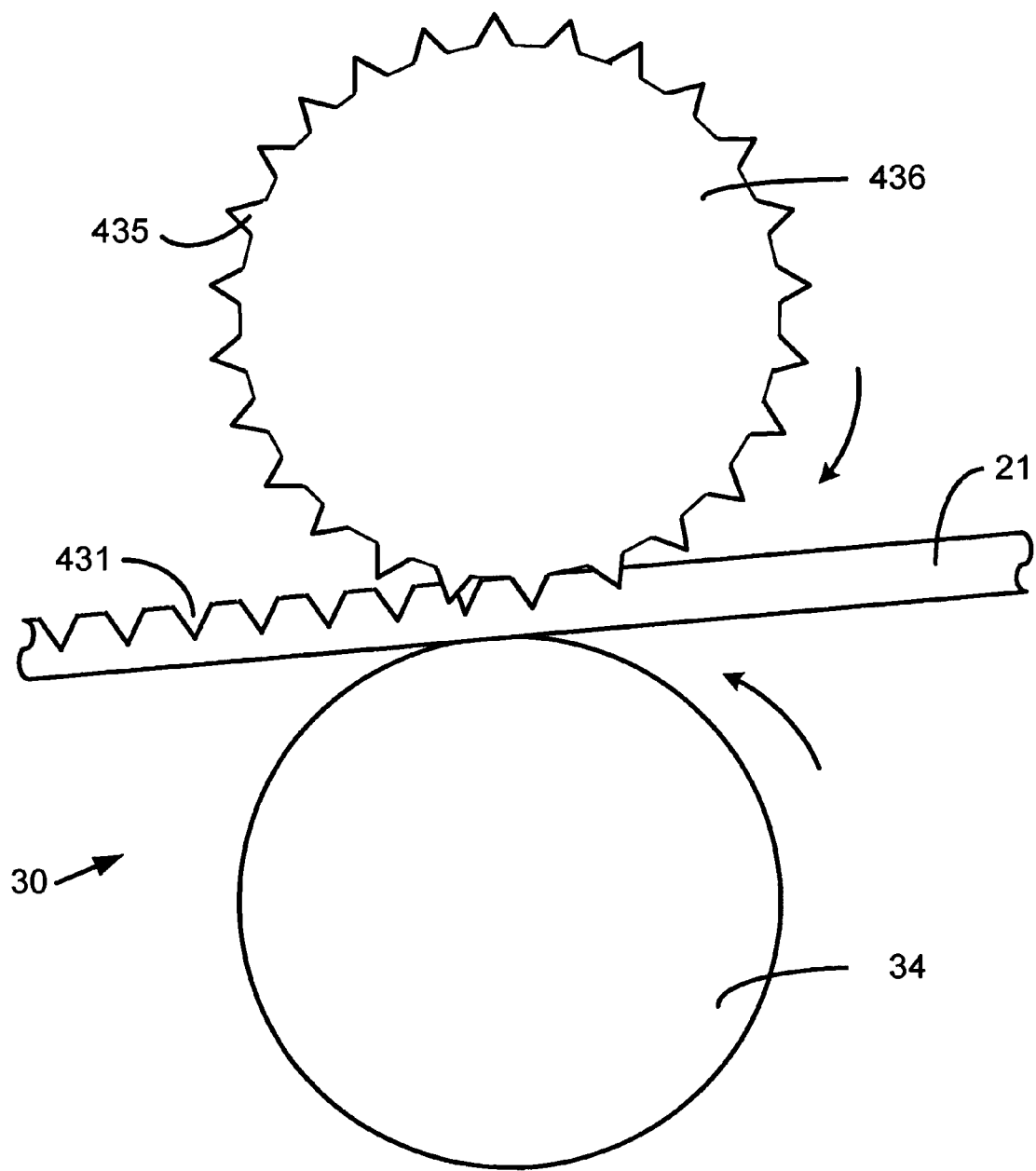
FIG. 4 is an enlarged side-view representation of the rotary die in accordance with the present invention, where the rotary die forms parallel grooves that run parallel to the latitudinal axis of the strip.

As shown in FIG. 4, grooves 431 in a strip 21 may be formed by a rotary die 30 that includes one cylinder 436 with ridges 435 and another cylinder 34, which has a smooth surface. The rotary die formed by the cylinders 434, 36 may operate on the strip 21 at the time that the strip itself is being manufactured, for example when it is in a molten, or semi-molten state. As the strip 21 passes between the rotary die formed by the two cylinders 434, 36, the ridges 435 press into the surface of strip 21 and form grooves 431. As a result, the strip 21 is impressed with grooves 31 that, in an embodiment, may run parallel to the latitudinal axis of the strip 21.

Figure 5:
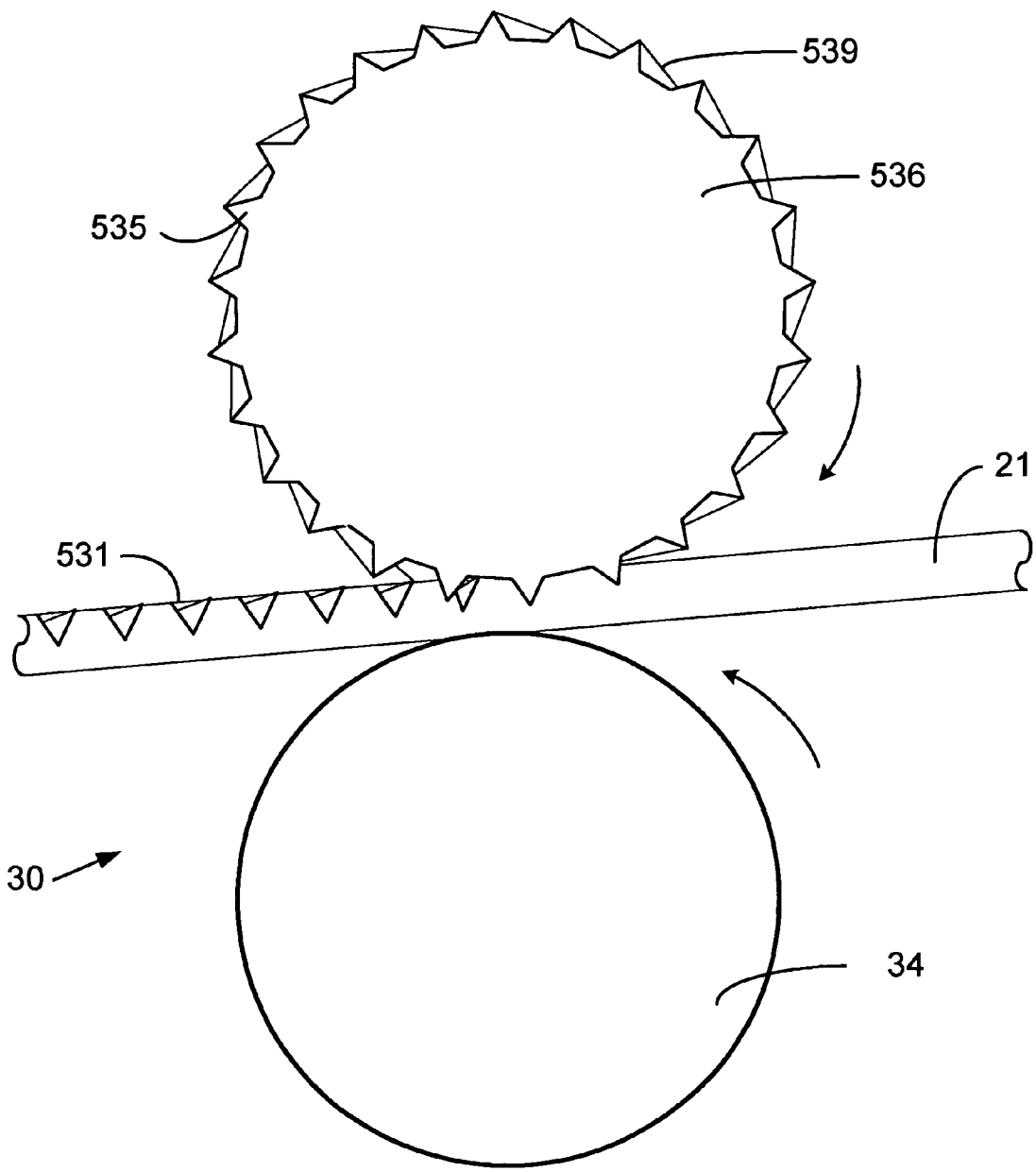
FIG. 5 is an enlarged side-view representation of the rotary die in accordance with the present invention, where the rotary die forms parallel grooves that translate at an angle to the latitudinal axis of the strip.
Figure 6:
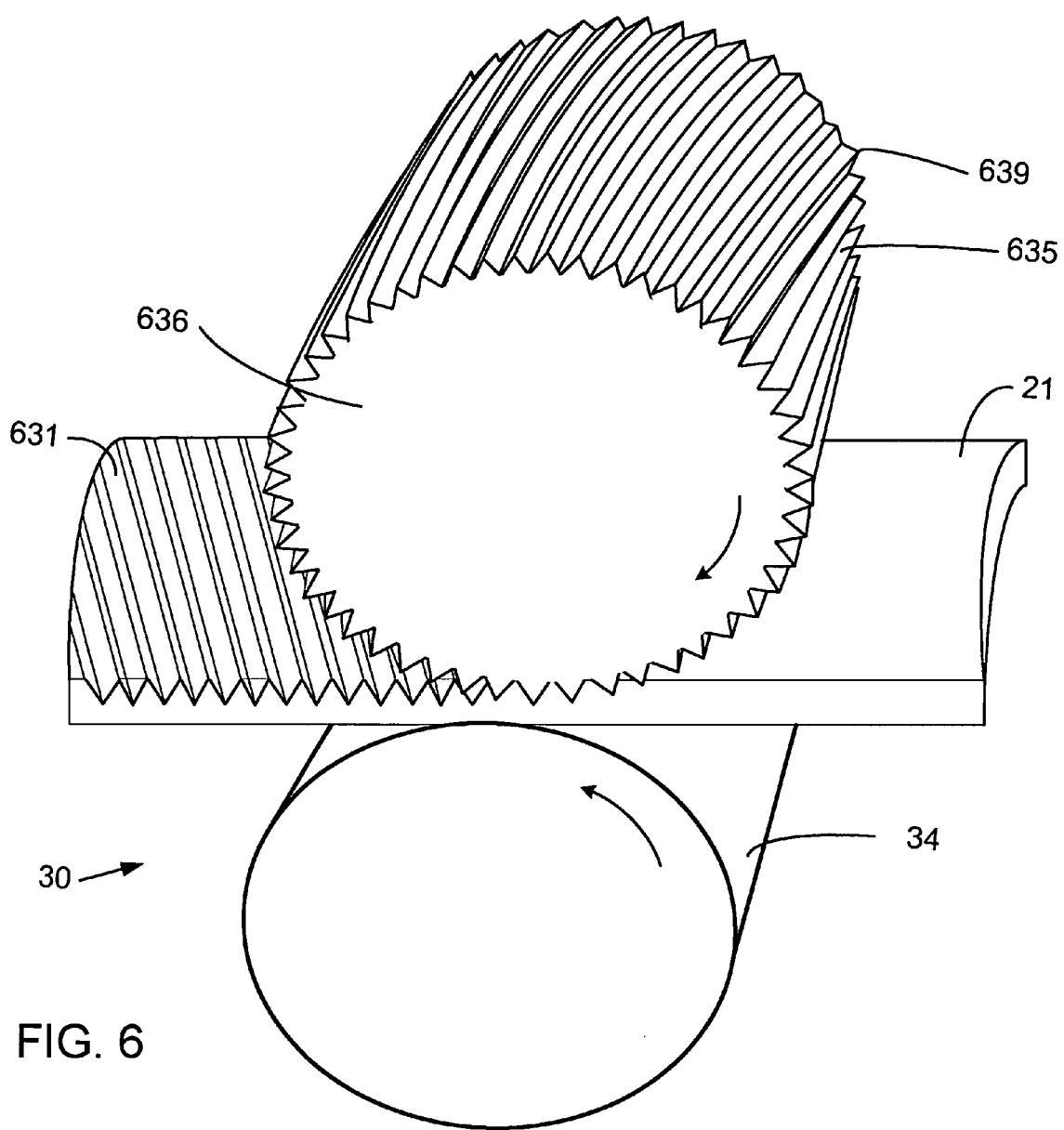
FIG. 6 is an enlarged top-view representation of the rotary die in accordance with the present invention, where the rotary die forms parallel grooves that translate at an angle to the latitudinal axis of the strip.

FIG. 5 shows a cylinder 536 having ridges 535 that run helically about the cylinder 536 at an angle to the axis of the cylinder 536. As a result, the strip 21 is given parallel grooves 531 that run at an angle to the latitudinal axis of the strip 21. The grooves on the strip may be formed at any angle. As seen in FIG. 6, in an embodiment, the grooves 631 on the strip 21 may be formed in a manner that will permit them to align with the longitudinal axis of the mandrel 1 when the strip 21 is wrapped helically about a mandrel.

In embodiments where the strips 21, 22 are to be grooved by knives, rotary/drill bits or by abrading or scraping the strips, polypropylene byproduct/overage resulting from the grooving operation may be collected for further use or sale. A vacuum (not shown) may assist in collecting the polypropylene byproduct. In some embodiments, the collected byproduct may be sold. In other embodiments, the collected byproduct may be used to manufacture other polypropylene products, for example, additional strip material.

In some embodiments, collected byproduct is reclaimed, for example, being used as adhesive for the manufacture of paint rollers. In such embodiments, the collected byproduct may be added to the to-be-extruded material and applied from the head 4 as discussed above.

Figure 7:
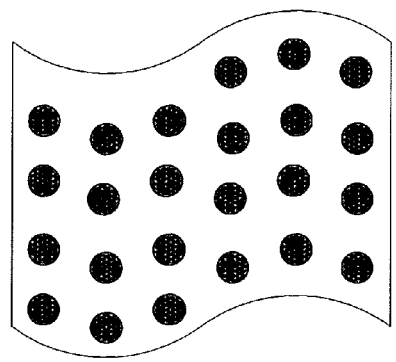
FIG. 7 is top-view diagrammatic representation of dimples on a strip in accordance with the present invention, wherein the dimples do not intersect with an edge of the strip.
Figure 8A:
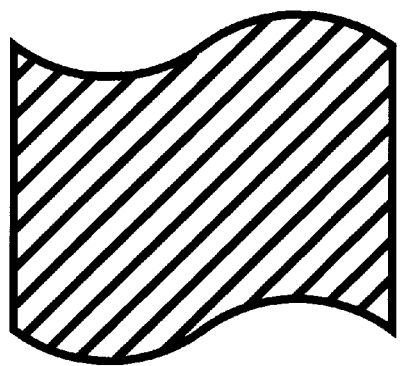
FIG. 8 is top-view diagrammatic representation of various types and positioning of grooves on a strip in accordance with the present invention, wherein the subfigures represent: (a)
Figure 8B:
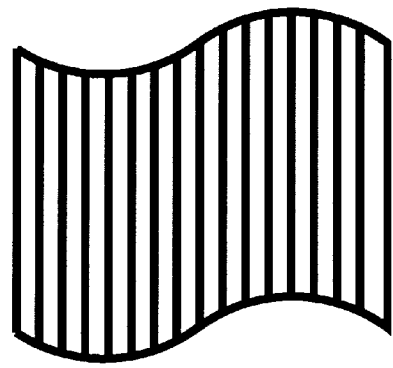
Figure 8C:
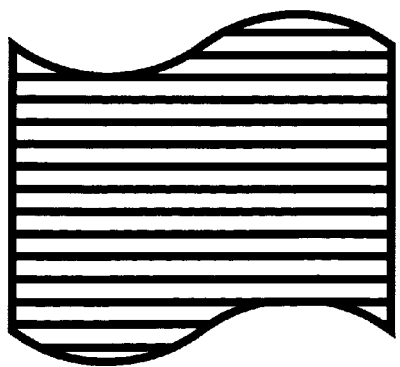
Figure 8D:
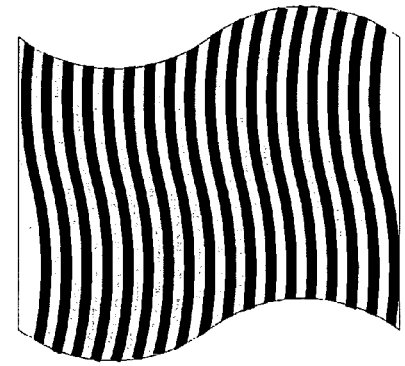

A strip that contains dimples is illustrated in FIG. 7. As with grooves, dimples may occur on either or both of the strips. Likewise, the dimples may occur on either or both of the sides of the strips. Furthermore, both grooves and dimples may occur on the strips, as shown in FIG. 9(d).

FIG. 8(a)-(d) show grooved strips comprising of different shapes and positioning of grooves. Note that embodiments may vary as to the number of grooves, the groove width, the groove spacing, as well as to the groove direction and relation to the other grooves on the strip. Grooves may be placed in a straight, zigzag, sinusoidal, random, or other manner on the strips. Also, grooves may be positioned in an uniform direction relative to the longitudinal axis of the strip. The direction may be perpendicular or angled with relation to the longitudinal axis.

In an embodiment, the shapes of the grooves of a first strip may be different from the shape, direction, width, or spacing of the grooves on a second strip. Variation between the placement and orientation of the grooves on the two strips may be controlled by the overlap amongst the grooves 31a, 32a when the second strip 22a is wound over the first strip 21a.

Figure 9A:
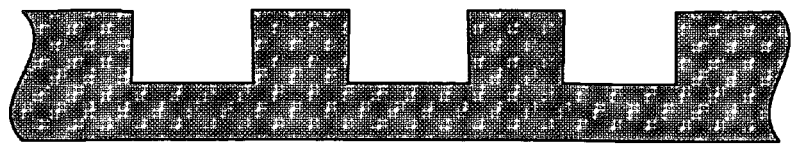
Figure 9B:
Figure 9C:
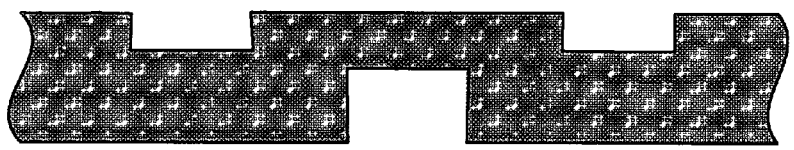
Figure 9D:
Figure 9E:
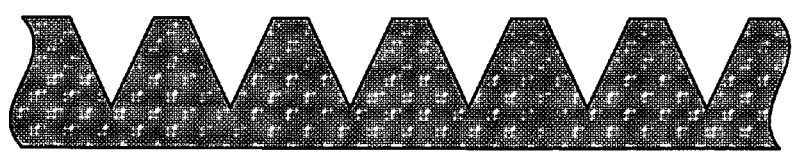
Figure 9F:
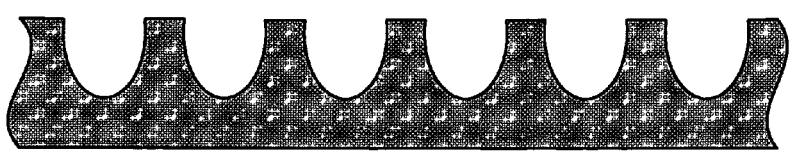
Figure 9G:
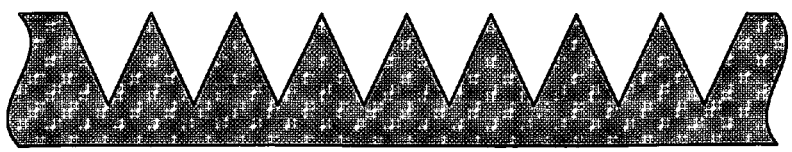

FIG. 9(a)-(g) shows cross-sectional views of exemplary grooves. The grooves do not go completely through the strip, e.g., from one face to the opposite face of the strip. The examples shown in FIG. 9 are not exhaustive. As will be apparent to one skilled in the art, the patterns, shapes, spacing, orientation, and sizes of the grooves may be varied. As depicted in FIG. 9(d), grooves and dimples may be placed on the same strip.

FIG. 10 illustrates a top-view of the various shapes of dimples that may be formed in the strips. The embodiments may include dimples of one or more of the following shapes: circle, elliptic, oval, quadrilateral, square, rectangle, rhombus, trapezoid, kite, diamond, triangle, pentagon, hexagon, heptagon, or octagon. The examples shown in FIG. 5 are not exhaustive. As will be apparent to one skilled in the art, the shapes, patterns, spacing, orientation, and sizes of the dimples may be varied.

In certain embodiments, the shape and size of the grooves 31, 32 may be predetermined according to desired objectives. For example, in certain embodiments a concern may be the balancing of the amount of polypropylene material removed from the strips 21, 22 and the overall strength of the finalized paint rollers. A goal may be to reduce the amount of material without compromising the quality of the rollers. Other variations of patterns may also be established. It is understood that the pattern may vary without departing from the scope of the present invention.

FIG. 11 illustrates an embodiment having a single grooved strip 21a with diagonal grooves 31a that are angled with respect to the axial direction of the mandrel 1. In an embodiment, adhesive 6 flows from die head 4 to fill and bond into the widened spaces formed by the grooves 31a in the strip 21a after the strip 21a is wound about the mandrel 1. Sufficient adhesive 6 is applied to permit the cover 23 to bond to the strip 21a when compressed by the belt 2 on the mandrel 1 cooled by cooler 5. In an embodiment, an adhesive layer is applied in an amount to permit more than 5 mills of adhesive to remain above the filled grooves 31a.

FIG. 12(a) shows a partially unwound cross-section of a roller for illustrative purposes only. A single strip 21a has grooves 31a. The strip 21a is fed about the roller 1 with its grooved side of the strip 21a away from the mandrel 1. Adhesive 6 is shown to fill the widened grooves 31c wrapped about the mandrel 1. In another embodiment, the strip may be fed about the roller 1 with the grooves 31a oriented towards the mandrel. In yet another embodiment, grooves 31a may occur on both sides of the strip 21a, and the strip 21a may be fed about the mandrel 1 in either relation.

The adhesive material 6 is illustratively shown between the strip 21a and cover 23. In the illustration (which is not to scale), the amount of adhesive material 6 is sufficient to fill the grooves 31a. In an embodiment, an amount of adhesive material 6 sufficient to fill the grooves and to additionally form a layer above (outside) the perimeter of strip 21a is used. A compressive force, such as that imparted by a helical drive belt 2 (not shown, but see helical drive belt 2 in FIG. 11) is used to urge the cover 23 towards the adhesive material 6 and the strip 21a and thus form a length of roller. In each of the foregoing examples in this paragraph, dimples (not show) can replace, or be used in addition to, the grooves 31a.

Figure 12B:
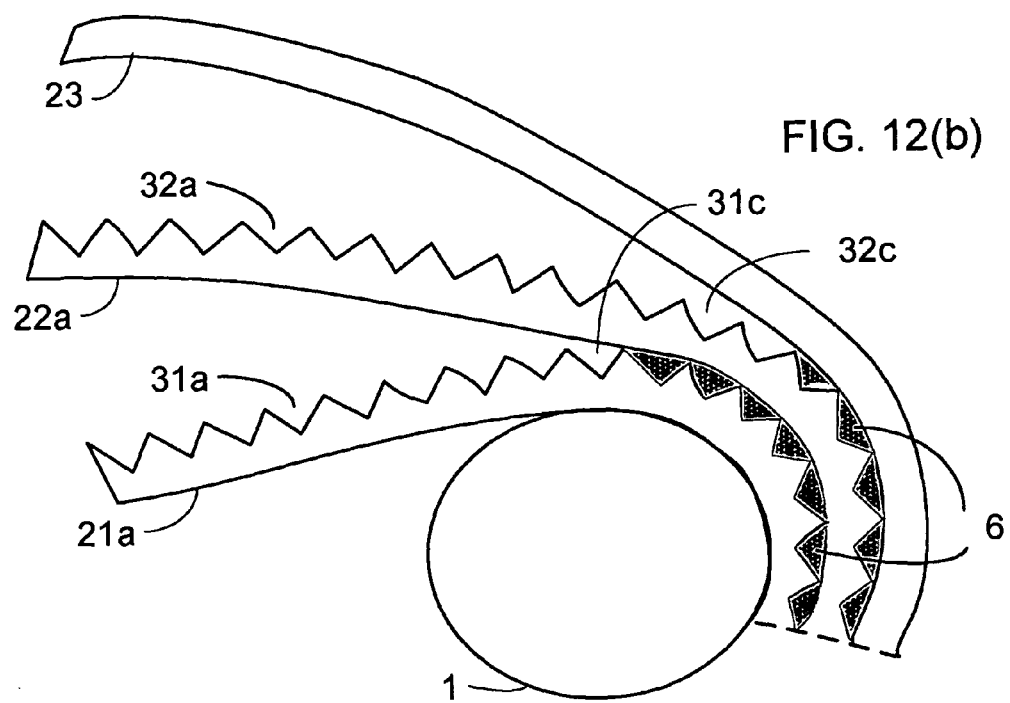

As seen in FIG. 12(b), two strips 21a, 22a with grooves 31a, 32a may be wound about the mandrel 1 to form the core of the finished paint roller. The grooves 31a, 32a may be placed on the inner side (e.g., towards the mandrel) or on the outer side (e.g., away from the mandrel, as shown) of the strips 21a, 22a as they are wound about the mandrel 1; strips 21a, 22a with grooves 31a, 32a on both sides may also be used. Both strips 21a, 22a may be grooved (as shown in FIG. 12(b)), or only one strip may be grooved, and the other strip not grooved (not shown). In an embodiment a paint roller can be formed from one or more strips with grooves and one or more strips without grooves. In each of the foregoing examples in this paragraph, dimples can be used instead of or in addition to grooves. Furthermore, one strip 21 may contain grooves 31 while the other strip 22 may contain dimples. Persons skilled in the art may experiment with combinations of grooves and dimples in order to achieve their desired results.

As the adhesive material 6 is applied, the widened grooves 31c, 32c are filled (or at least partially filled) by the adhesive material 6. In an embodiment, an amount of adhesive 6 is used to permit the grooves 31c, 32c to be completely filled and for additional layer of adhesive 6 to be present over and above the outer limit of the grooves 31c, 32c. Certain embodiments may include the first strip 21a having grooves 31a on the outer surface and the second strip 22a having grooves 32a on the inner surface. In such embodiments the strips 21a, 22a may be aligned so that the grooves 31a, 32a engage each other. It is believed that less adhesive material 6 will be required to manufacture a paint roller in this way.

In an embodiment, the grooves or dimples have a depth of about 75% of the thickness of the strip. It is expected that additional amounts of adhesive material may be required to fill the grooves, and exceed the depth of the grooves or dimples. In addition to filling the grooves or dimples, a layer of adhesive material is formed about the wound strips. In an embodiment, a layer of adhesive material can be formed that has a thickness of about 15 mils. The width and thickness of the adhesion material may be varied to achieve the desired results. The overall volume of adhesive to be applied in a two strip 21a, 22a embodiment must be sufficient to permit bonding of the inner strip 21a to the outer strip 22a and to permit bonding of the cover 23 to the outer strip 22a. The amount of adhesive 6 used may also depend to some extent on the material of the cover 23 backing.

A benefit of the instant invention is that the total weight of polypropylene in the strips used in manufacturing a roller may be reduced. A benefit of the instant invention is that the cost of materials required to manufacture a polypropylene paint roller is reduced. It is expected that adhesive material may fill all or a portion of the grooves; and the adhesive material may be polypropylene. The adhesive material is generally less expensive by weight than the price of polypropylene strips. Hence, the finalized paint roller made from one or more grooved strip has a reduced cost of polypropylene, even if the grooves are completely filled with adhesive material. Additionally, the adhesive material may be made of a cheaper lower-grade resin such as off-grade industrial seconds. In some embodiments, less adhesive material may be required because byproduct may be reclaimed from the grooving process. Thus, a less expensive roller can be produced.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention, and has disclosed the ways the inventor now believes are the best ways to practice the invention. The most obvious variations to the present invention include variation in the size and shape of the groove and variations in the pattern and placement of the grooves. It is understood that the above description and drawings are merely illustrative of the present invention and that changes in components, structure and procedure are possible without departing from the scope of the present invention as defined in the following claims.

What is claimed is:

1. A method for producing a paint roller comprising the steps of:
    feeding a substrate about a mandrel, wherein a surface of the substrate has a plurality of grooves;
    applying adhesive upon the outer surface of the grooved substrate, thereby filling the plurality of grooves with the adhesive;
    applying a cover about the grooved substrate, thereby covering the adhesive; and,
    applying a compressing force upon the cover urging the cover toward the grooved substrate, thereby creating the paint roller.

2. The method of claim 1, wherein the plurality of grooves run parallel to one another.

3. The method of claim 1, wherein the cross-section of at least one groove of the plurality of grooves is a section of a shape selected from the group consisting of circle, elliptic, oval, quadrilateral, square, rectangle, rhombus, trapezoid, kite, diamond, triangle, pentagon, hexagon, heptagon, octagon.

4. The method of claim 1, wherein the grooved substrate is a polypropylene strip.

5. The method of claim 4, wherein the grooved surface of the polypropylene strip includes the inner surface of one wind of the polypropylene strip.

6. The method of claim 4, wherein the grooved surface of the polypropylene strip includes the outer surface of one wind of the polypropylene strip.

7. The method of claim 4, wherein the grooved surface of the polypropylene strip includes the outer surface and the inner surface of one wind of the polypropylene strip.

8. The method of claim 7, wherein the plurality of grooves on the inner surface of the polypropylene strip are positioned along the longitudinal axis of the polypropylene strip at an offset in relation to the plurality of grooves on the outer surface of the polypropylene strip.

9. The method of claim 7, wherein the plurality of grooves on the inner surface of the polypropylene strip are the same shape as the plurality of grooves on the outer surface of the polypropylene strip.

10. The method of claim 4, wherein each one of the plurality of grooves are grooves that run parallel to one another.

11. The method of claim 10, wherein the parallel grooves run parallel to the longitudinal axis of the polypropylene strip.

12. The method of claim 10, wherein the parallel grooves run parallel to the latitudinal axis of the polypropylene strip.

13. The method of claim 10, wherein the parallel grooves translate at an angle to the latitudinal axis of the polypropylene strip.

14. The method of claim 10, wherein the parallel grooves are straight.

15. The method of claim 10, wherein the parallel grooves are curved.

16. A method for producing a paint roller comprising the steps of:
    shaping a surface of a substrate about a mandrel, thereby forming a plurality of grooves, wherein the resulting surface of the substrate has a plurality of grooves;
    feeding the grooved substrate about a mandrel;
    applying adhesive upon the outer surface of the grooved substrate;

applying a cover about the grooved substrate, thereby covering the adhesive; and, applying a compressing force upon the cover urging the cover toward the grooved substrate, thereby creating the paint roller.

17. The method of claim 16, wherein the step of shaping the surface of the substrate comprises of the step of:

applying a compressing force upon the surface of the substrate, thereby creating the plurality of grooves.

18. The method of claim 17, wherein the step of applying a compressing force upon the surface of the substrate comprises of the steps of:

feeding the substrate through a rotary die, wherein the rotary die has a first cylinder and a second cylinder, wherein the substrate passes between the two cylinders, wherein the first cylinder has a plurality of ridges, wherein the second cylinder has a smooth surface;

indenting the substrate, wherein the plurality of ridges press into the surface of the substrate, thereby forming the plurality of grooves on the surface of the substrate.

19. The method of claim 16, wherein the substrate is a polypropylene strip.

20. A method for producing a paint roller comprising the steps of:

feeding a surface-relieved substrate about a mandrel, wherein a surface of the substrate has a plurality of surface-reliefs;

applying adhesive upon the outer surface of the surface-relieved substrate;

applying a paint absorbing and spreading cover about the surface-relieved substrate, thereby covering the adhesive on the outer surface of the surface-relieved substrate; and, applying a compressing force upon the cover urging the cover toward the surface-relieved substrate, thereby creating the paint roller.

21. The method of claim 20, wherein the cross-section of at least one surface-relief of the plurality of surface-reliefs is a section of a shape selected from the group consisting of circle, elliptic, oval, quadrilateral, square, rectangle, rhombus, trapezoid, kite, diamond, triangle, pentagon, hexagon, heptagon, octagon.

22. The method of claim 20, wherein the surface-relieved substrate is a polypropylene strip.

23. The method of claim 22, wherein the relieved surface of the polypropylene strip includes the inner surface of one wind of the polypropylene strip.

24. The method of claim 22, wherein the relieved surface of the polypropylene strip includes the outer surface of one wind of the polypropylene strip.

25. The method of claim 22, wherein the relieved surface of the polypropylene strip includes the outer surface and the inner surface of one wind of the polypropylene strip.

26. The method of claim 25, wherein the plurality of surface-reliefs on the inner surface of the polypropylene strip are positioned at an offset in relation to the plurality of surface-reliefs on the outer surface of the polypropylene strip.

27. The method of claim 25, wherein the plurality of surface-reliefs on the inner surface of the polypropylene strip are the same shape as the plurality of surface-reliefs on the outer surface of the polypropylene strip.

28. The method of claim 22, wherein at least one of the plurality of surface-reliefs is a dimple, wherein the dimple does not intersect with an edge of the polypropylene strip.

29. The method of claim 28, wherein the plurality of dimples are positioned in parallel rows on the polypropylene strip.

* * * * *